(12) United States Patent
Satake et al.

(10) Patent No.: US 8,311,596 B2
(45) Date of Patent: Nov. 13, 2012

(54) ELECTRONIC DEVICE WITH ROTATIONAL POSITION DETERMINATION UNIT

(75) Inventors: Kanji Satake, Yokohama (JP); Tomoyoshi Ikeda, Yokohama (JP)

(73) Assignee: Kyocera Corporation, Kyoto (JP)

( * ) Notice: Subject to any disclaimer, the term of this patent is extended or adjusted under 35 U.S.C. 154(b) by 21 days.

(21) Appl. No.: 12/994,467

(22) PCT Filed: May 28, 2009

(86) PCT No.: PCT/JP2009/059791
§ 371 (c)(1),
(2), (4) Date: Dec. 29, 2010

(87) PCT Pub. No.: WO2009/145265
PCT Pub. Date: Dec. 3, 2009

(65) Prior Publication Data
US 2011/0105201 A1   May 5, 2011

(30) Foreign Application Priority Data

May 29, 2008 (JP) ................................ 2008-140334

(51) Int. Cl.
*H04M 1/00* (2006.01)
(52) U.S. Cl. .................................. 455/575.1; 455/550.1
(58) Field of Classification Search ............... 455/575.1, 455/575.3, 575.4
See application file for complete search history.

(56) References Cited

U.S. PATENT DOCUMENTS

| 2004/0266477 | A1 | 12/2004 | Murata |
| 2005/0049017 | A1 | 3/2005 | Yoda |
| 2005/0079898 | A1* | 4/2005 | Park ........................... 455/575.1 |
| 2007/0287504 | A1* | 12/2007 | Lim et al. ...................... 455/566 |

FOREIGN PATENT DOCUMENTS

CN     1592318 A     3/2004
(Continued)

OTHER PUBLICATIONS

Communication from foreign patent office for a counterpart foreign application, dated Mar. 27, 2012.
(Continued)

*Primary Examiner* — Lester Kincaid
*Assistant Examiner* — Daniel Lai
(74) *Attorney, Agent, or Firm* — Hoffmann & Baron, LLP

(57) ABSTRACT

Provided is an electronic device for detecting the relative rotational positions of two casing members optically without utilizing the difference in the reflecting efficiency between a plurality of reflecting portions. The electronic device comprises a first light emitting unit (51) for emitting a light (R), a first casing member (2) mounting the first light emitting unit (51), a first light receiving unit (61) for receiving the light (R), a second casing member (3) mounting the first light receiving unit (61) and so connected to the first casing member (2) as to rotate on a spindle (41), and a detecting unit for detecting the rotational position of the second casing member (3) relative to the first casing member (2), on the basis of the reception of the light (R) emitted from the first light emitting unit (51) in the first light receiving unit (61). The first light emitting unit (51) is arranged in the first casing member (2) and on a first circumference (C1) centering on the spindle (41), and the first light receiving unit (61) is arranged in the second casing member (3) and on a second circumference (C2) facing the first circumference (C1) and centering on the spindle (41).

6 Claims, 11 Drawing Sheets

FOREIGN PATENT DOCUMENTS

| | | |
|---|---|---|
| CN | 1578325 A | 2/2005 |
| JP | 2005-64843 A | 3/2005 |
| JP | 2005-78322 A | 3/2005 |
| JP | 2005-107074 A | 4/2005 |
| JP | 2005-107976 A | 4/2005 |
| JP | 2005-295228 A | 10/2005 |
| JP | 2007-235722 A | 9/2007 |

OTHER PUBLICATIONS

English translation of foreign patent office communication of Mar. 27, 2012.
Equivalent English abstract for CN 1578325 A.
Equivalent English abstract for CN 1592318 A.

* cited by examiner

ELECTRONIC DEVICE WITH ROTATIONAL POSITION DETERMINATION UNIT

CROSS-REFERENCE TO RELATED APPLICATIONS

The present application is the national stage of International Application No. PCT/JP2009/059791, filed May 28, 2009, which claims priority to Japanese Application No. 2008-140334, filed May 29, 2008, the entire contents of which are incorporated by reference herein.

TECHNICAL FIELD

The present invention relates to an electronic device such as a cellular telephone.

BACKGROUND ART

Conventionally, in an electronic device such as a cellular telephone that is configured by connecting two bodies, a technique is known, in which a light emitting/receiving unit (a light emitting unit and a light receiving unit) is provided in a first body, a plurality of reflecting portions each having a different reflection efficiency are provided, and the levels of the light reflected on the reflecting portions are detected, thereby detecting a relative rotation position between the two bodies (for example, see Patent Document 1).

Patent Document 1: Japanese Unexamined Patent Application Publication No. 2007-235722

DISCLOSURE OF THE INVENTION

Problems to be Solved by the Invention

In the technique disclosed in Patent Document 1, a relative rotation position between the two bodies is detected by utilizing the difference of the reflection efficiencies among the plurality of reflecting portions. Therefore, a desired function is fulfilled as long as the reflection efficiencies that are set in the reflecting portions are maintained.

However, in a case in which some of the reflecting portions of the plurality of reflecting portions deteriorate due to corrosion, etc., a result of which the reflection efficiency of the reflecting portions decreases, there is a possibility that the levels of the light reflected on the plurality of reflecting portions cannot be distinguished. In that case, a relative rotation position between the two bodies cannot be accurately detected.

Such a problem would occur in electronic devices other than a cellular telephone.

Therefore, an object of the present invention is to provide an electronic device that is capable of optically detecting a relative rotation position between two bodies without utilizing a difference of reflection efficiency in a plurality of reflecting portions.

Means for Solving the Problems

The present invention relates to an electronic device, including: a first light emitting unit that emits light; a first body in which the first light emitting unit is mounted; a first light receiving unit that receives light; a second body, in which the first light receiving unit is mounted, and which is connected to the first body so as to be rotatable around a rotational axis; and a detecting unit that detects a rotation position of the second body relative to the first body, by detecting presence or absence of light reception, in the first light receiving unit, of the light emitted from the first light emitting unit, in which the first light emitting unit is disposed on a first circumference around the rotational axis in the first body, and the first light receiving unit is disposed on a second circumference facing the first circumference and being around the rotational axis in the second body.

Moreover, it is preferable that the second body is held to the first body in a plurality of rotation positions, in which a rotation angle of the second body relative to the first body is a multiple of a preset setting angle, the first light emitting unit is disposed in a part or all of the plurality of rotation positions on the first circumference such that an angle thereof is a multiple of the setting angle, the first light receiving unit is disposed in a part or all of the plurality of rotation positions on the second circumference such that an angle thereof is a multiple of the setting angle, and the first light receiving unit is disposed such that a disposition pattern of the first light emitting unit in any rotation position of the plurality of rotation positions is not a same disposition pattern as a disposition pattern of the first light emitting unit in another rotation position of the plurality of rotation positions.

In addition, in a case in which an integer obtained by dividing 360 degrees by the setting angle is an integer N, a number of the first light emitting unit disposed on the first circumference in a position such that an angle thereof is a multiple of the setting angle is a first number L, and a number of the first light receiving unit disposed on the second circumference in a position such that an angle thereof is a multiple of the setting angle is a second number R, it is preferable that the integer N, the first number L and the second number R are set so as to satisfy a relationship expressed by formulae 1 and 2 below:

$$L \leq R \leq N \qquad \text{formula 1:}$$

$$N \leq L+R \leq 2N-1. \qquad \text{formula 2:}$$

Furthermore, it is preferable that the integer N, the first number L and the second number R are set so as to satisfy a relationship expressed by formula 3 below:

$$L+R \geq N+1. \qquad \text{formula 3:}$$

Moreover, it is preferable that the first light receiving unit receives the light emitted from the first light emitting unit, thereby transmitting a signal from the first body to the second body.

In addition, it is preferable that the electronic device further includes: a second light emitting unit that is mounted in a position overlapping with the rotational axis in the second body; and a second light receiving unit, which is mounted in a position overlapping with the rotational axis in the first body, and which is disposed so as to face the second light emitting unit, in which the second light receiving unit receives the light emitted from the second light emitting unit, thereby transmitting a signal from the second body to the first body.

Furthermore, the present invention relates to an electronic device, including: a first light emitting unit that emits light; a third light receiving unit that receives light; a first body in which the first light emitting unit and the third light receiving unit are mounted; a third light emitting unit that emits light; a first light receiving unit that receives light; a second body, in which the third light emitting unit and the first light receiving unit are mounted, and which is connected to the first body so as to be rotatable around a rotational axis; and a detecting unit that detects presence or absence of light reception, in the first light receiving unit, of the light emitted from the first light emitting unit, or presence or absence of light reception, in the third light receiving unit, of the light emitted from the third light emitting unit, thereby detecting a rotation position of the second body relative to the first body, and transmitting and receiving a signal between the first body and the second body, in which the first light emitting unit is disposed on a first circumference around the rotational axis in the first body, the first light receiving unit is disposed on a second circumference facing the first circumference and being around the rotational axis in the second body, the third light emitting unit is disposed on a third circumference around the rotational axis in the second body, and the third light receiving unit is disposed on a fourth circumference facing the third circumference and being around the rotational axis in the first body.

Effects of the Invention

According to the present invention, a relative rotation position between two bodies can be optically detected without utilizing a difference of reflection efficiency among a plurality of reflecting portions.

PREFERRED MODE FOR CARRYING OUT THE INVENTION

Figure 1:
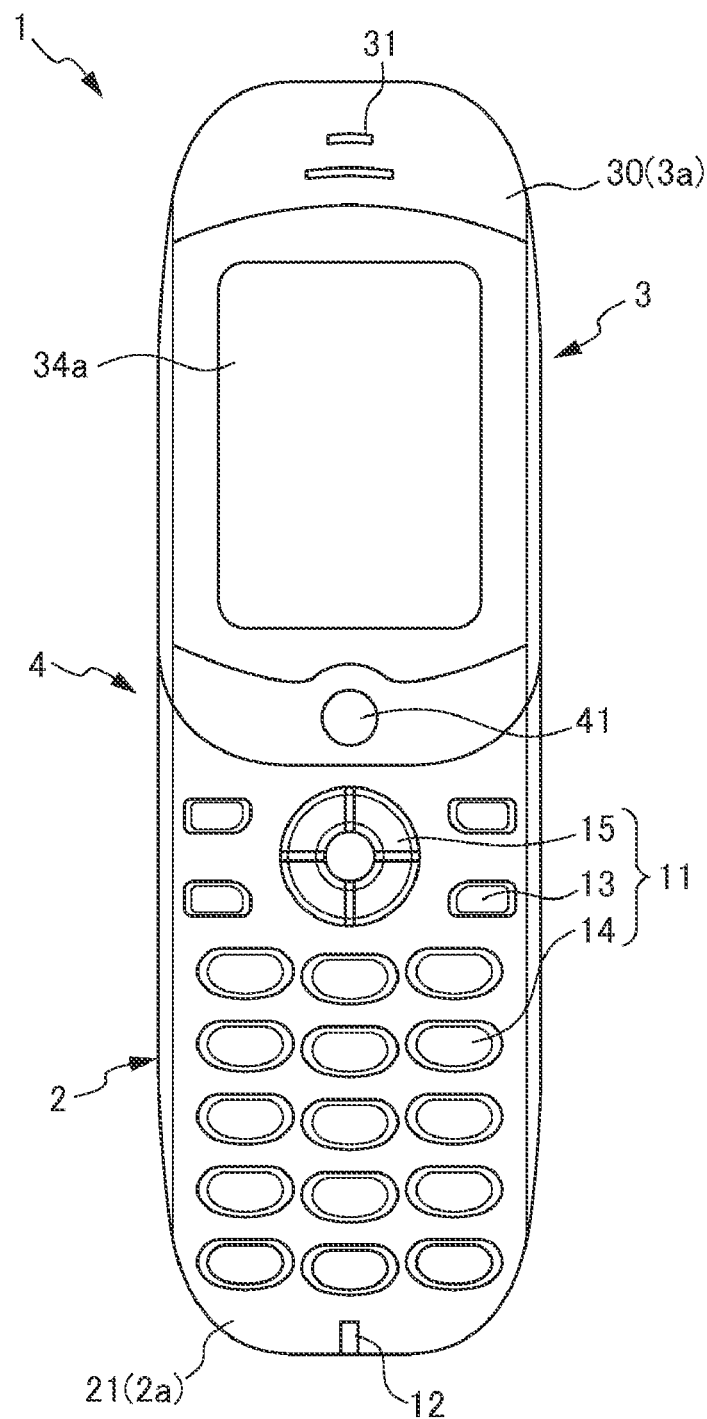
FIG. 1 is a front view showing a cellular telephone 1 according to a first embodiment of the present invention, in a state in which an operation unit side body 2 and a display unit side body 3 are opened.
Figure 2:
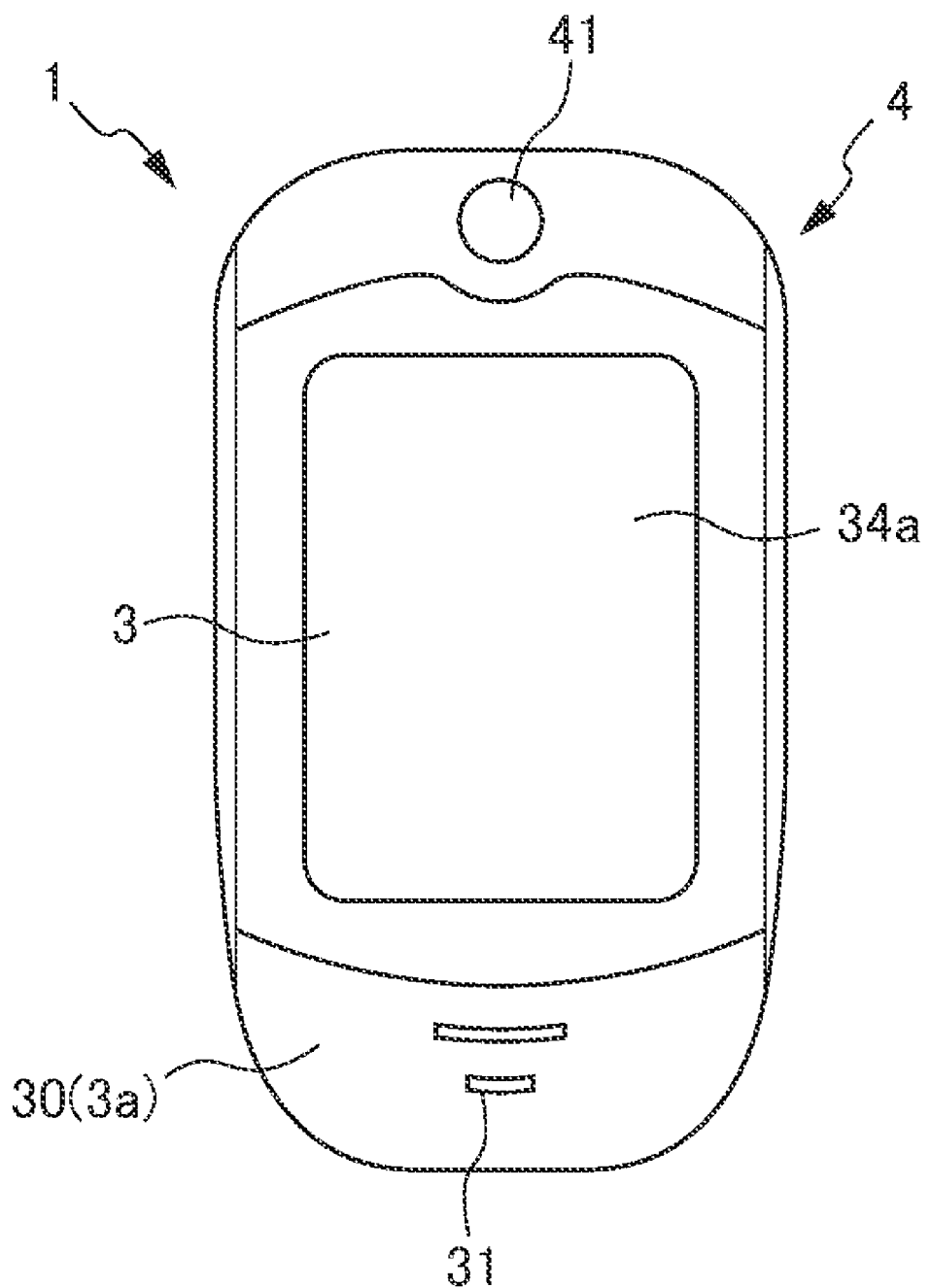
FIG. 2 is a front view showing the cellular telephone 1 shown in FIG. 1, in a state in which the operation unit side body 2 and the display unit side body 3 are closed.

An example of embodiments of the present invention is hereinafter described with reference to the drawings. FIG. 1 is a front view showing a cellular telephone 1 according to a first embodiment of the present invention, in a state in which an operation unit side body 2 and a display unit side body 3 are opened. FIG. 2 is a front view showing the cellular telephone 1 shown in FIG. 1, in a state in which the operation unit side body 2 and the display unit side body 3 are closed.

As shown in FIGS. 1 and 2, the cellular telephone 1 includes the operation unit side body 2 that is a first body, and the display unit side body 3 that is a second body. The cellular telephone 1 of the present embodiment is a cellular telephone 1 of a so-called rotating type (turning type), in which one body can be rotated around a rotational axis 41 extending in a direction so as to superimpose the operation unit side body 2 and the display unit side body 3 (the direction penetrating the paper plane of FIGS. 1 and 2). In other words, an upper end portion of the operation unit side body 2 and a lower end portion of the display unit side body 3 are connected via a connecting portion 4 including the rotational axis 41 so as to be rotatable around the rotational axis 41.

Therefore, the cellular telephone 1 of the present embodiment is configured such that the operation unit side body 2 and the display unit side body 3 connected via the connecting portion 4 can be relatively moved. In detail, the cellular telephone 1 is configured so as to be capable of being switched between a state in which the operation unit side body 2 and the display unit side body 3 are opened (an opened state; see FIG. 1), and a state in which the operation unit side body 2 and the display unit side body 3 are closed (a closed state; see FIG. 2). The closed state is a state in which a front face 2a of the operation unit side body 2 and a rear face 3b (see FIG. 4) of the display unit side body 3 are superimposed with each other. States other than the closed state are referred to as the opened state.

As shown in FIGS. 1 and 2, an external surface of the operation unit side body 2 is configured with: a front case 21 forming a front face 2a side; and a rear case (not shown) forming a rear face side. The operation unit side body 2 is configured to expose, on the front case 21 side, an operation key set 11 and a sound input unit 12 as a microphone where the sound of the user of the cellular phone 1 is input when conversing.

The operation key set 11 is configured with: function setting operation keys 13 for operating various functions such as for various settings, a telephone number directory function and a mail function; and input operation keys 14 for inputting digits of a telephone number, characters for mail, etc.; and a selection operation key 15 that performs selection of the various operations and scrolls up, down, left and right.

Predetermined functions are assigned (key assignment) to each key configuring the operation key set 11 in accordance with the opened/closed state of the operation unit side body 2 and the display unit side body 3, various modes, and the type of application that is running. An operation corresponding to a function assigned to each key is executed by the user depressing each key.

The sound input unit 12 is disposed to an outer end side that is opposite to the connecting portion 4 side in a longitudinal direction of the operation unit side body 2. In other words, the sound input unit 12 is disposed to an outer end side of the cellular telephone 1 in the opened state.

Figure 4:
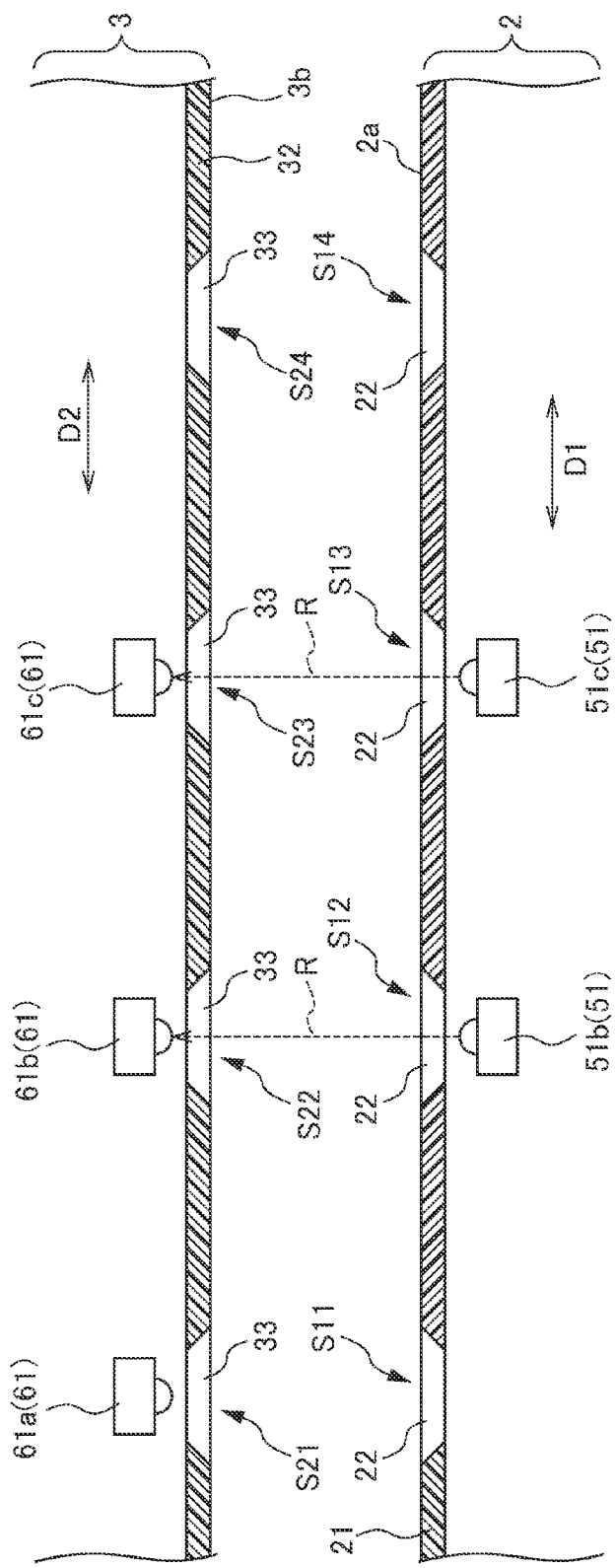
FIG. 4 is a diagram showing a first circumference C1 that is virtually developed into a linear shape along an extending direction D1 thereof, and a second circumference C2 that is virtually developed into a linear shape along an extending direction D2 thereof.

An external surface of the display unit side body 3 is configured with: a front case 30 forming a front face 3a side; and a rear case 32 forming a rear face 3b side (see FIG. 4). The display unit side body 3 is configured with disposition to expose, on a front case 30 side, a main display unit 34a for displaying a variety of information, and a sound output unit 31 for outputting sound of the other party of a conversation.

Next, each light emitting unit and each light receiving unit in the operation unit side body 2 and the display unit side body 3 are described with reference to FIGS. 3 and 4.

Figure 3:
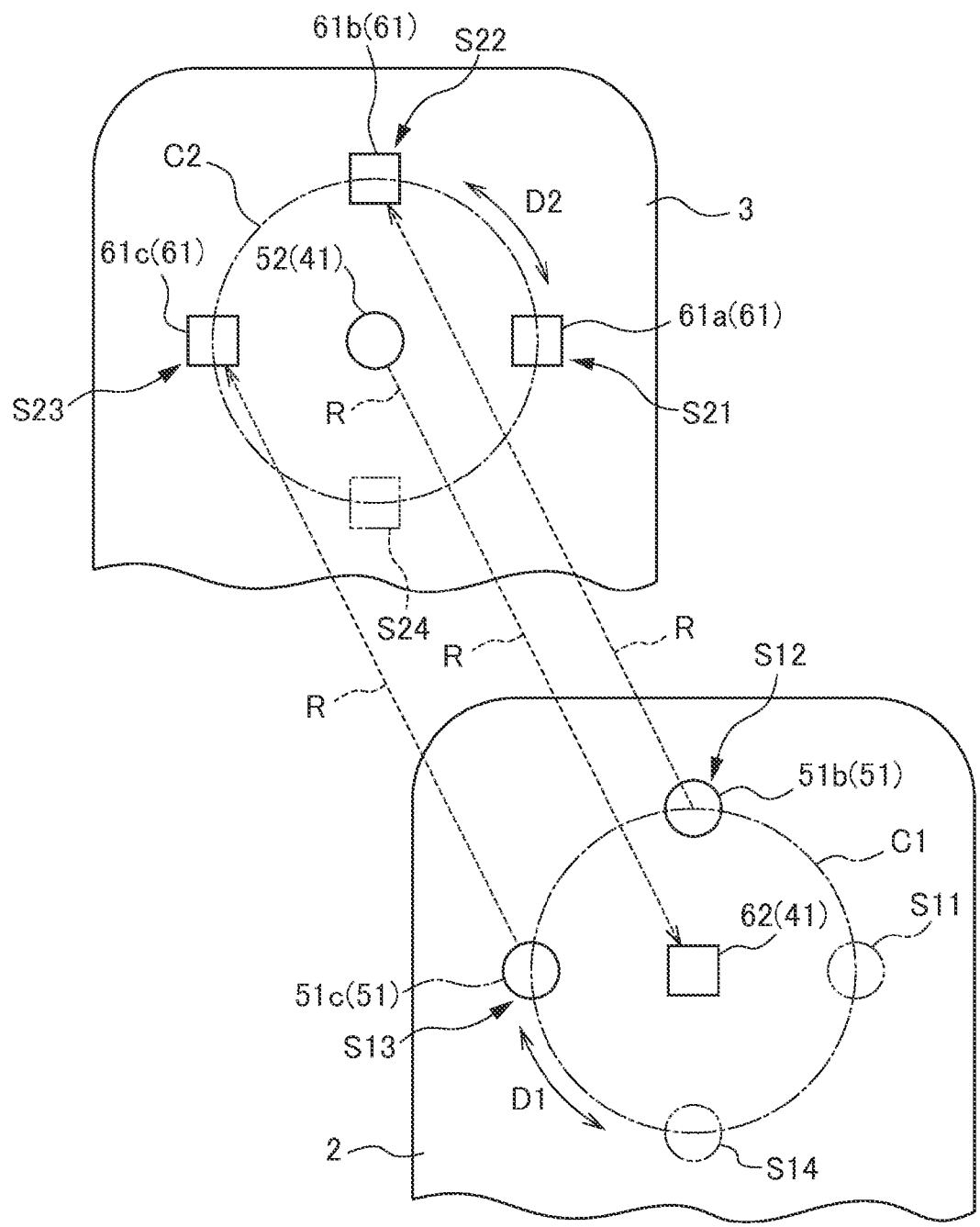
FIG. 3 is a diagram schematically showing disposition positions of first light emitting units 51 and a second light receiving unit 62 in the operation unit side body 2, as well as disposition positions of first light receiving units 61 and a second light emitting unit 52 in the display unit side body 3.

FIG. 3 is a diagram schematically showing disposition positions of first light emitting units 51 and a second light receiving unit 62 in the operation unit side body 2, as well as disposition positions of first light receiving units 61 and a second light emitting unit 52 in the display unit side body 3. FIG. 4 is a diagram showing a first circumference C1 that is virtually developed into a linear shape along an extending direction D1 thereof, and a second circumference C2 that is virtually developed into a linear shape along an extending direction D2 thereof.

As shown in FIGS. 3 and 4, the first light emitting units 51 and the second light receiving unit 62 are mounted in the operation unit side body 2.

The first light emitting units 51 are portions that emit light R, and consist of, for example, a semiconductor device that emits light when a voltage is applied thereto. The first light emitting units 51 are disposed on the first circumference C1 around the rotational axis 41 in the operation unit side body 2.

The second light receiving unit 62 is a portion that receives light, and consists of, for example, a photosensor. The second light receiving unit 62 is disposed in a position overlapping with the rotational axis 41 in the operation unit side body 2.

The first light receiving units 61 and the second light emitting unit 52 are mounted in the display unit side body 3.

The first light receiving units 61 are portions that receive light, and consist of, for example, a photosensor. The first light receiving units 61 are disposed on the second circumference C2 in the display unit side body 3. The second circumference C2 has the rotational axis 41 as its center, and faces the first circumference C1.

The second light emitting unit 52 is a portion that emits light, and consists of, for example, a semiconductor device that emits light when a voltage is applied thereto. The second light emitting unit 52 is disposed in a position overlapping with the rotational axis 41 and facing the second light receiving unit 62 in the display unit side body 3.

Figure 6:
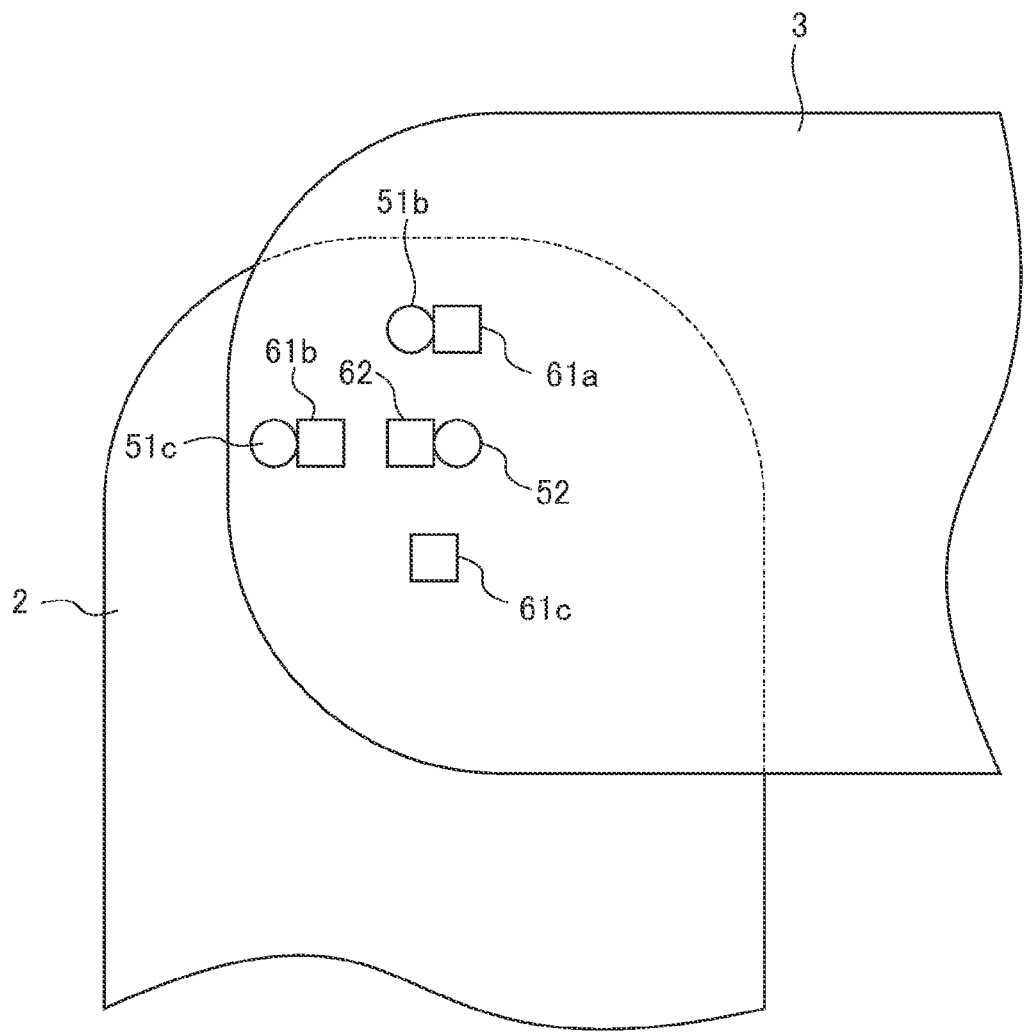
FIG. 6 is a diagram showing a state (second rotation position) in which the display unit side body 3 is rotated 90 degrees anticlockwise to the operation unit side body 2 around the rotational axis 41.

In the present embodiment, a rotation position detecting unit (a detecting unit) 71 is provided (see FIG. 6). The rotation position detecting unit 71 detects a rotation position of the display unit side body 3 relative to the operation unit side body 2, by detecting presence or absence of light reception, in the first light receiving units 61, of the light R emitted from the first light emitting units 51. The rotation position detecting unit 71 is later described in detail.

A configuration is employed such that the display unit side body 3 is held to the operation unit side body 2 in a plurality of rotation positions, in which a rotation angle θ of the display unit side body 3 relative to the operation unit side body 2 is a multiple of a preset setting angle φ.

It is preferable that the setting angle φ is an angle obtained by dividing 360 degrees by an integer. The setting angle φ is, for example, 180 degrees (=360 degrees/2), 120 degrees (=360 degrees/3), 90 degrees (=360 degrees/4), 72 degrees (=360 degrees/5), 60 degrees (=360 degrees/6), 45 degrees (=360 degrees/8), or 30 degrees (=360 degrees/12).

In the present embodiment, the setting angle φ is 90 degrees. Therefore, there are four rotation positions of the display unit side body 3 relative to the operation unit side body 2 (see FIGS. 5 to 8).

The rotation angle θ is expressed as a rotation angle in an anticlockwise manner with the operation unit side body 2 serving as a reference point, in which the operation unit side body 2 is viewed from the display unit side body 3. For example, in a case in which the display unit side body 3 is rotated 90 degrees anticlockwise to the operation unit side body 2, the rotation angle θ is 90 degrees (see FIG. 6). In a case in which the display unit side body 3 is rotated 90 degrees clockwise to the operation unit side body 2, the rotation angle θ is 270 degrees (see FIG. 8).

The first light emitting unit(s) 51 is disposed in a part or all of the plurality of positions on the first circumference C1 such that the angle thereof is a multiple of the setting angle φ. The first circumference C1 is a virtual circumference on which the first light emitting units 51 are positioned. On the first circumference C1, a position on an upper end portion side (an upper side thereof in FIG. 3) in the operation unit side body 2 from the rotational axis 41 is referred to as a "second position S12". A position on a lower end portion side (a lower side thereof in FIG. 3) in the operation unit side body 2 from the rotational axis 41 is referred to as a "fourth position S14". Moreover, a position of being displaced 90 degrees clockwise from the second position S12 is referred to as a "first position S11". A position of being displaced 90 degrees anticlockwise from the second position S12 is referred to as a "third position S13".

It should be noted that an expression "the first light emitting units 51" is used when providing a description that is common to each of the first light emitting units. On the other hand, when providing an individual description of each of the first light emitting units, an expression such as a "first light emitting unit 51b" and a "first light emitting unit 51c" is used.

In the present embodiment, the first light emitting unit 51b is disposed in the second position S12, and the first light emitting unit 51c is disposed in the third position S13. The plurality of the first light emitting units 51 are adjacently disposed.

On the other hand, the first light emitting units 51 are not disposed in the first position S11 and the fourth position S14. It should be noted that the first position S11 and the fourth position S14 are indicated with a two-dot chain line in FIG. 3.

The first light receiving unit(s) 61 is disposed in a part or all of the plurality of positions on the second circumference C2 such that the angle thereof is a multiple of the setting angle φ. The second circumference C2 is a virtual circumference on which the first light receiving units 61 are positioned. On the second circumference C2, a position on an upper end portion side (an upper side thereof in FIG. 3) in the display unit side body 3 from the rotational axis 41 is referred to as a "second position S22". A position on a lower end portion side (a lower side thereof in FIG. 3) in the display unit side body 3 from the rotational axis 41 is referred to as a "fourth position S24". Moreover, a position of being displaced 90 degrees clockwise from the second position S22 is referred to as a "first position S21". A position of being displaced 90 degrees anticlockwise from the second position S22 is referred to as a "third position S23".

It should be noted that an expression "the first light receiving units 61" is used when providing a description that is common to each of the first light receiving units. On the other hand, when providing an individual description of each of the first light receiving units, an expression such as a "first light receiving unit 61a", a "first light receiving unit 61b" and a "first light receiving unit 61c" is used.

In the present embodiment, the first light receiving unit 61a is disposed in the first position S21, the first light receiving unit 61b is disposed in the second position S22, and the first light receiving unit 61c is disposed in the third position S23. The plurality of the first light receiving units 61 are adjacently disposed.

On the other hand, the first light receiving unit 61 is not disposed in the fourth position S24. It should be noted that the fourth position S24 is indicated with a two-dot chain line in FIG. 3.

In the front case 21 of the operation unit side body 2, four first open holes 22 are provided in positions corresponding to the first position S11, the second position S12, the third position S13 and the fourth position S14 on the first circumference C1, respectively. Therefore, the first light emitting units 51 are exposed on the front face 2*a* side of the operation unit side body 2 through the first open holes 22.

In the rear case 32 of the display unit side body 3, four second open holes 33 are provided in positions corresponding to the first position S21, the second position S22, the third position S23 and the fourth position S24 on the second circumference C2, respectively. Therefore, the first light receiving units 61 are exposed on the rear face 3*b* side of the display unit side body 3 through the second open holes 33.

In the cellular telephone 1 of the present embodiment, the first light receiving units 61 receive the light R emitted from the first light emitting units 51, thereby transmitting a signal from the operation unit side body 2 to the display unit side body 3.

In addition, the second light receiving unit 62 receives the light R emitted from the second light emitting unit 52, thereby transmitting a signal from the display unit side body 3 to the operation unit side body 2.

As shown in FIGS. 5 to 8, a configuration is employed such that, when the display unit side body 3 is rotated relative to the operation unit side body 2 around the rotational axis 41, the display unit side body 3 is held to the operation unit side body 2 in positions in which the rotation angle θ of the display unit side body 3 relative to the operation unit side body 2 is a multiple of the preset setting angle φ.

Figure 5:
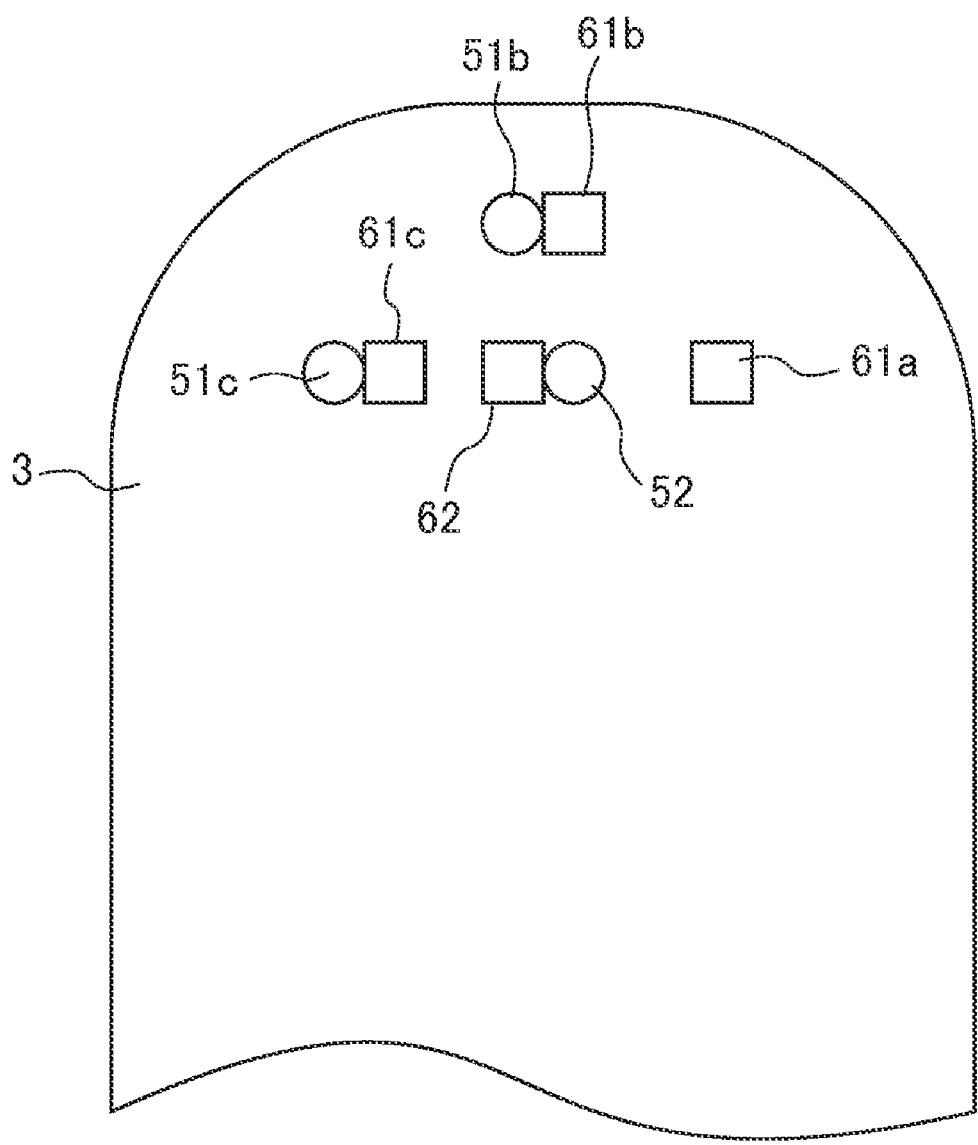
FIG. 5 is a diagram schematically showing the cellular telephone 1 in the closed state (in the first rotation position) (FIG. 5 corresponds to FIG. 2)
Figure 7:
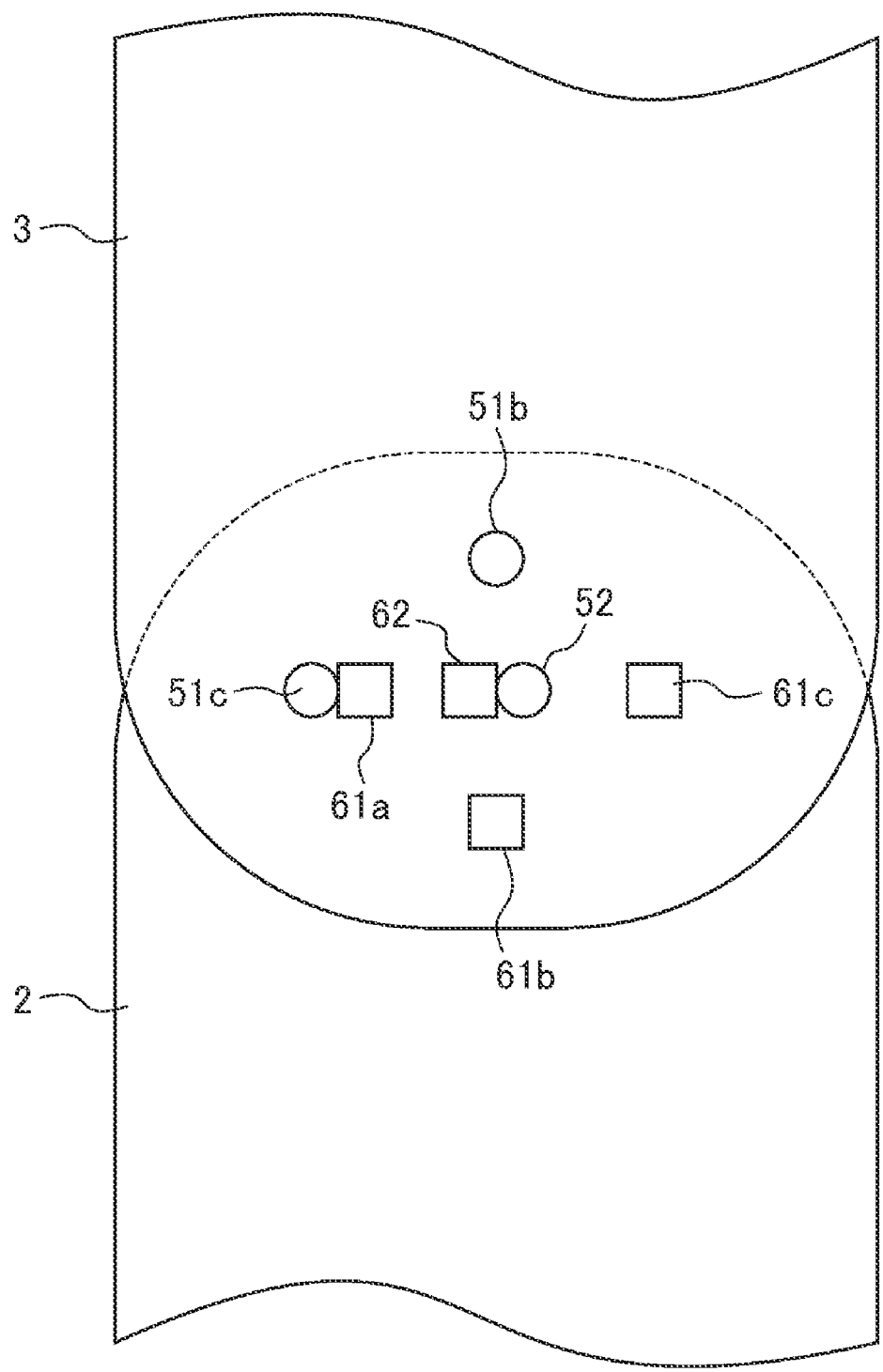
FIG. 7 is a diagram showing a state (third rotation position) in which the display unit side body 3 is rotated 180 degrees relative to the operation unit side body 2 around the rotational axis 41.
Figure 8:
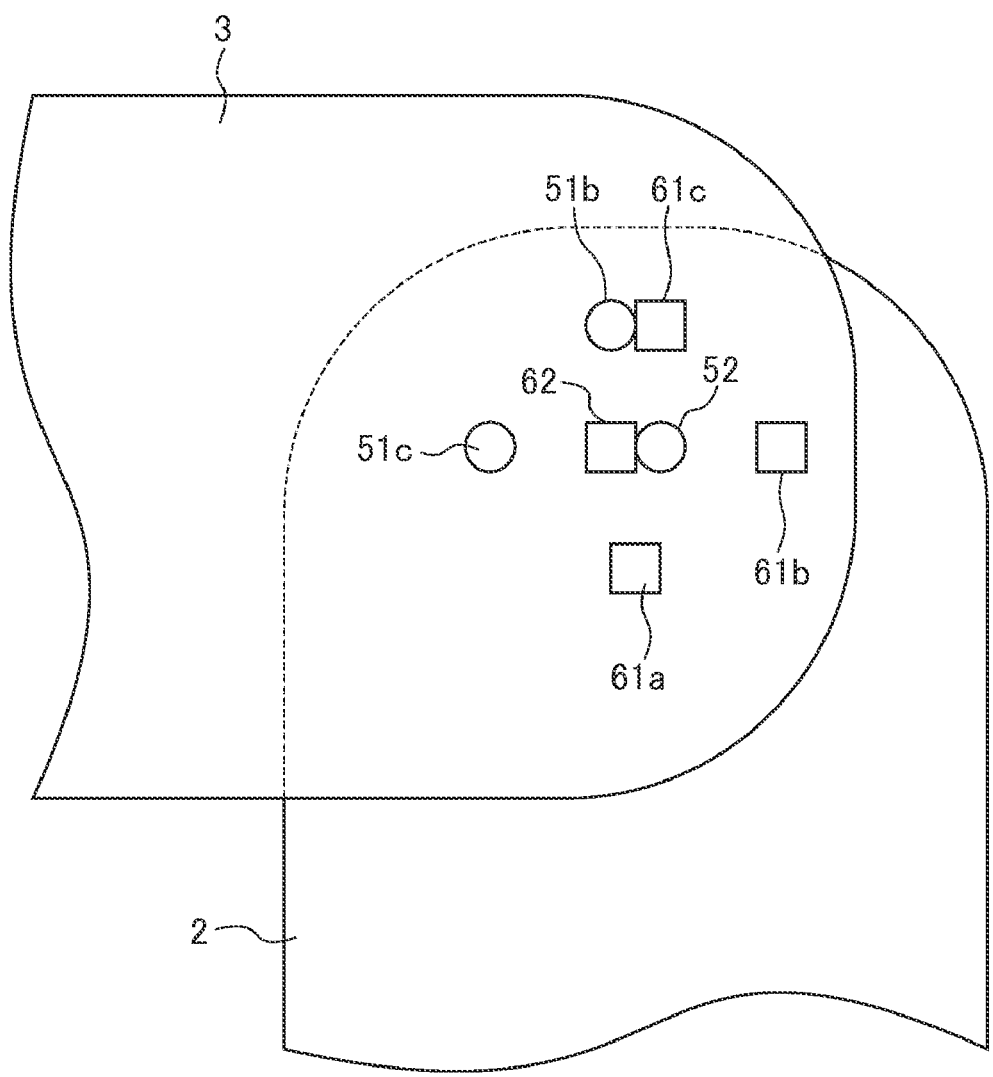
FIG. 8 is a diagram showing a state (fourth rotation position) in which the display unit side body 3 is rotated 270 degrees anticlockwise to the operation unit side body 2 around the rotational axis 41.

FIG. 5 is a diagram schematically showing the cellular telephone 1 in the closed state (in the first rotation position) (FIG. 5 corresponds to FIG. 2). FIG. 6 is a diagram showing a state (second rotation position) in which the display unit side body 3 is rotated 90 degrees anticlockwise to the operation unit side body 2 around the rotational axis 41. FIG. 7 is a diagram showing a state (third rotation position) in which the display unit side body 3 is rotated 180 degrees relative to the operation unit side body 2 around the rotational axis 41. FIG. 8 is a diagram showing a state (fourth rotation position) in which the display unit side body 3 is rotated 270 degrees anticlockwise to the operation unit side body 2 around the rotational axis 41.

In the present embodiment, as shown in FIGS. 5 to 8, a configuration is employed such that the display unit side body 3 is held to the operation unit side body 2 in rotation positions in which the rotation angle θ of the display unit side body 3 relative to the operation unit side body 2 is a multiple of 90 degrees (0, 90, 180 or 270 degrees). The configuration for holding the display unit side body 3 to the operation unit side body 2 is not particularly limited, and various holding means can be utilized.

In addition, the first light emitting units 51 are disposed such that a disposition pattern of the first light emitting unit 51 in any rotation position of (the plurality of) the first, second, third and fourth rotation positions is not the same disposition pattern as a disposition pattern of the first light emitting unit 51 in another rotation position of the plurality of rotation positions. Here, a disposition pattern of the first light emitting unit 51 is expressed by which of the plurality of positions (S21, S22, S23, S24) is faced by the first light emitting unit 51 in each rotation position, in which the angle thereof is a multiple of the setting angle φ on the second circumference C2.

For example, with reference to FIGS. 3 and 5 to 8, in the first rotation position, positions faced by the two first light emitting units 51*b* and 51*c* on the second circumference C2 are the positions S22 and S23, respectively. Accordingly, this disposition pattern is expressed as a pattern (S22, S23). Similarly, in the second rotation position, a disposition pattern of the first light emitting units 51 is a pattern (S21, S22). Similarly, in the third rotation position, a disposition pattern of the first light emitting units 51 is a pattern (S24, S21). Similarly, in the fourth rotation position, a disposition pattern of the first light emitting units 51 is a pattern (S23, S24). In this way, the disposition patterns of the first light emitting units 51 are all different among each rotation position.

Conversely, as an example in which the disposition patterns of the first light emitting units 51 in different rotation positions are the same disposition pattern, for example, in the first rotation position and the third rotation position, two of the first light emitting units 51 may be in positions facing each other on the second circumference C2. In other words, as the aforementioned example, the disposition patterns of the first light emitting units 51 may be a pattern (S22, S24) and a pattern (S24, S22), and in the second rotation position and the fourth rotation position, the disposition patterns of the first light emitting units 51 may be a pattern (S21, S23) and a pattern (S23, S21).

It should be noted that the pattern (S22, S24) and the pattern (S24, S22) are the same disposition pattern. Similarly, the pattern (S21, S23) and the pattern (S23, S21) are the same disposition pattern. This is because of a presupposition that the plurality of the first light emitting units 51*b* and 51*c* are substantially the same type of the first light emitting units 51, i.e. on the first light receiving unit 61 side, it is not possible to distinguish which of the first light emitting units 51 has emitted the light.

In the present invention, in a case in which an integer obtained by dividing 360 degrees by the setting angle φ is an integer N, a number of the first light emitting units 51 disposed in positions on the first circumference C1 such that the angle thereof is a multiple of the setting angle φ is a first number L, and a number of the first light receiving units 61 disposed in positions on the second circumference C2 such that the angle thereof is a multiple of the setting angle φ is a second number R, it is preferable that the integer N, the first number L and the second number R satisfy the relationship expressed by the following formulae 1 and 2.

$$L \leq R \leq N \qquad \text{Formula 1:}$$

$$N \leq L + R \leq 2N - 1 \qquad \text{Formula 2:}$$

In the present embodiment, since the setting angle φ is 90 degrees, the integer N is 4 (360 degrees/90 degrees=4). The (first) number L of the first light emitting units 51 on the first circumference C1 is two. The (second) number R of the first light receiving units 61 on the second circumference C2 is three. When the integer N (=4), the first number L (=2) and the second number R (=3) are substituted into the above formulae 1 and 2, it is understood that the relationship expressed by the formulae 1 and 2 is satisfied as follows.

$$2 \leq 3 \leq 4 \qquad \text{Formula 1:}$$

$$4 \leq 2 + 3 \leq 2*4 - 1 \qquad \text{Formula 2:}$$

Moreover, in the present invention, it is preferable that the integer N, the first number L and the second number R further satisfy the relationship expressed by the formula 3 shown below.

$$L+R \geq N+1 \qquad \text{Formula 3:}$$

In the present embodiment, when the integer N (=4), the first number L (=2) and the second number R (=3) are substituted into the above formula 3, it is understood that the relationship expressed by the formula 3 is satisfied as follows.

$$2+3 \geq 4+1 \qquad \text{Formula 3:}$$

Next, a positional relationship of the first light emitting units 51 and the first light receiving units 61 in a case of rotating the display unit side body 3 relative to the operation unit side body 2 is described with reference to FIGS. 5 to 8.

As shown in FIG. 5, in the closed state (in the first rotation position), the first position S11, the second position S12, the third position S13 and the fourth position S14 in the operation unit side body 2 face the first position S21, the second position S22, the third position S23 and the fourth position S24 in the display unit side body 3, respectively.

In addition, the first light emitting unit 51b positioned in the second position S12 in the operation unit side body 2 faces in the first light receiving unit 61b positioned in the second position S22 in the display unit side body 3. The first light emitting unit 51c positioned in the third position S13 in the operation unit side body 2 faces the first light receiving unit 61c positioned in the third position S23 in the display unit side body 3.

On the other hand, the first light emitting unit 51 does not exist in the first position S11 in the operation unit side body 2; therefore, the first light receiving unit 61a positioned in the first position S21 in the display unit side body 3 does not face the first light emitting unit 51.

In the cellular telephone 1 of the present embodiment, in the closed state (in the first rotation position) shown in FIGS. 3 to 5, the light R emitted from the first light emitting unit 51b positioned in the second position S12 is received by the first light receiving unit 61b positioned in the second position S22.

Furthermore, the light R emitted from the first light emitting unit 51c positioned in the third position S13 is received by the first light receiving unit 61c positioned in the third position S23. Moreover, the light R emitted from the second light emitting unit 52 positioned in a position overlapping with the rotational axis 41 in the display unit side body 3 is received by the second light receiving unit 62 positioned in a position overlapping with the rotational axis 41 in the operation unit side body 2.

In this way, in the present embodiment, in the closed state (in the first rotation position) shown in FIGS. 3 to 5, between two facing sets, i.e. the first light emitting units 51 and the first light receiving units 61 facing each other, the light R emitted from the first light emitting units 51 is received by the first light receiving units 61. As a result, two propagation paths of the light R are formed.

In addition, between the second opposed light emitting unit 52 and the second light receiving unit 62 facing each other, the light R emitted from the second light emitting unit 52 is received by the second light receiving unit 62. As a result, one propagation path of the light R is formed.

Next, a positional relationship of two of the first light emitting units 51 (51b, 51c) in the operation unit side body 2 and three of the first light receiving units 61 (61a, 61b, 61c) in the display unit side body 3 in a case of rotating the display unit side body 3 at 90 degrees each to the operation unit side body 2 about the rotational axis 41 is described with reference to FIGS. 6 to 8.

As shown in FIG. 6, in a state (in the second rotation position) in which the display unit side body 3 is rotated 90 degrees anticlockwise to the operation unit side body 2 around the rotational axis 41, the first light emitting unit 51b coincides (overlaps) with the first light receiving unit 61a, and the first light emitting unit 51c coincides (overlaps) with the first light receiving unit 61b.

Furthermore, the second light emitting unit 52 coincides (overlaps) with the second light receiving unit 62 regardless of the rotation angle θ of the display unit side body 3 relative to the operation unit side body 2.

Therefore, in the second rotation position shown in FIG. 6, between two facing sets, i.e. the first light emitting units 51 (51b, 51c) and the first light receiving units 61 (61a, 61b), the light R emitted from the first light emitting units 51 is received by the first light receiving units 61. As a result, two propagation paths of the light R are formed. In addition, between the second opposed light emitting unit 52 and the second light receiving unit 62 facing each other, the light R emitted from the second light emitting unit 52 is received by the second light receiving unit 62. As a result, one propagation path of the light R is formed.

As shown in FIG. 7, in a state (in the third rotation position) in which the display unit side body 3 is rotated 180 degrees relative to the operation unit side body 2 around the rotational axis 41, the first light emitting unit 51c coincides (overlaps) with the first light receiving unit 61a.

Furthermore, as described above, the second light emitting unit 52 coincides (overlaps) with the second light receiving unit 62 regardless of the rotation angle θ of the display unit side body 3 relative to the operation unit side body 2.

On the other hand, the first light emitting unit 51b does not coincide (overlap) with the first light receiving unit 61.

Therefore, in the third rotation position shown in FIG. 7, in one facing set, i.e. the first light emitting unit 51 (51c) and the first light receiving unit 61 (61a), the light R emitted from the first light emitting unit 51 is received by the first light receiving unit 61. As a result, one propagation path of the light R is formed. In addition, between the second opposed light emitting unit 52 and the second light receiving unit 62 facing each other, the light R emitted from the second light emitting unit 52 is received by the second light receiving unit 62. As a result, one propagation path of the light R is formed.

As shown in FIG. 8, in a state (in the fourth rotation position) in which the display unit side body 3 is rotated 270 degrees anticlockwise to the operation unit side body 2 around the rotational axis 41, the first light emitting unit 51b coincides (overlaps) with the first light receiving unit 61c.

Furthermore, as described above, the second light emitting unit 52 coincides (overlaps) with the second light receiving unit 62 regardless of the rotation angle θ of the display unit side body 3 relative to the operation unit side body 2.

On the other hand, the first light emitting unit 51c does not coincide (overlap) with the first light receiving unit 61.

Therefore, in the fourth rotation position shown in FIG. 8, in one facing set, i.e. the first light emitting unit 51 (51b) and the first light receiving unit 61 (61c), the light R emitted from the first light emitting unit 51 is received by the first light receiving unit 61. As a result, one propagation path of the light R is formed. In addition, between the second opposed light emitting unit 52 and the second light receiving unit 62 facing each other, the light R emitted from the second light emitting unit 52 is received by the second light receiving unit 62. As a result, one propagation path of the light R is formed.

It should be noted that, when the display unit side body 3 is disposed in any of the first to fourth rotation positions shown in FIGS. 5 to 8, respectively, the light R emitted from the first light emitting units 51 is received by the first light receiving units 61. In other words, a signal is communicated by way of propagation of the light R. Therefore, in the middle of communication from one signal communication position to another signal communication position, the communication of the signal is interrupted. In this case, before interrupting transmission and reception of the light signal, in order to detect that the position of the display unit side body 3 has been changed, it is preferable that an encoder with superior detection accuracy is used, or output differences of a plurality of sensors are compared, thereby detecting the rotation position of the display unit side body 3. Moreover, in a case in which the signal communication has been interrupted, the receiving side may request the transmitting side to retransmit the interrupted signal.

Next, a functional configuration in the cellular telephone 1 according to the first embodiment is described with reference to FIGS. 9 and 10.

Figure 9:
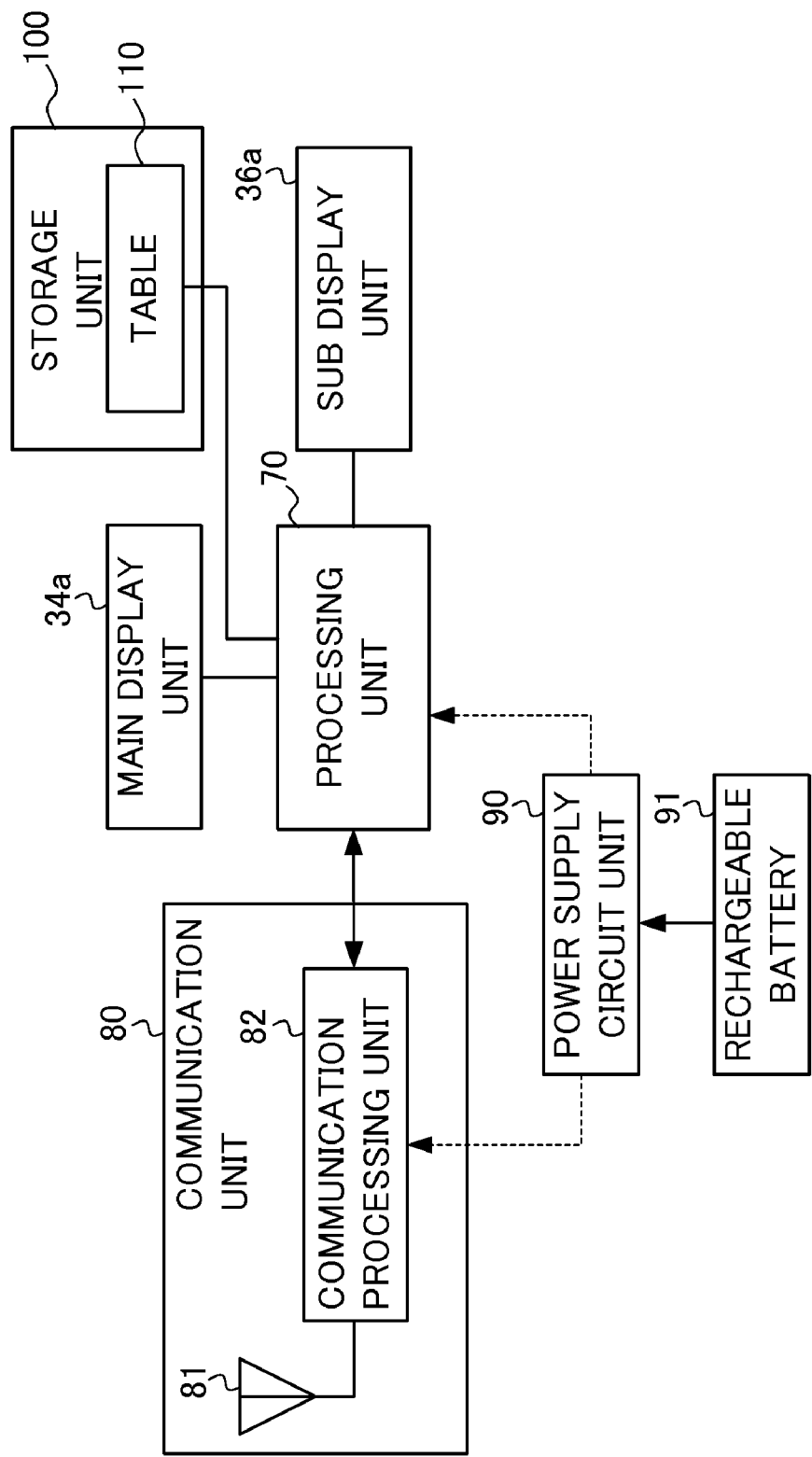
FIG. 9 is a functional block diagram showing functions of the cellular telephone of the first embodiment.
Figure 10:
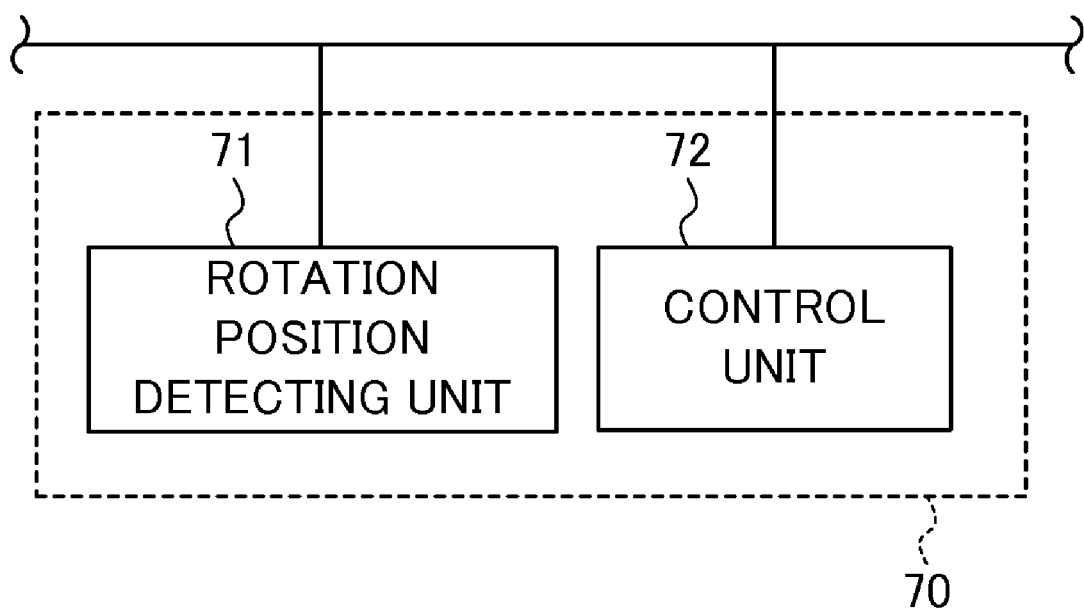
FIG. 10 is a functional block diagram of a processing unit 70.

FIG. 9 is a functional block diagram showing functions of the cellular telephone of the first embodiment. FIG. 10 is a functional block diagram of a processing unit 70.

As shown in FIG. 9, the cellular telephone of the first embodiment includes: a main display unit 34a that displays predetermined information; a sub display unit 36a (not shown in FIGS. 1 and 2) that displays predetermined information; a communication unit 80 that communicates with external terminals; a processing unit 70 that performs predetermined processing; a rechargeable battery 91 having a predetermined capacity; a power supply circuit unit 90 that converts a power supply voltage supplied from the rechargeable battery 91 into a predetermined power voltage, and supplies the converted power supply voltage to the communication unit 80, the processing unit 70, etc.; and a storage unit 100.

The communication unit 80 includes: a main antenna 81 that communicates with external devices via a predetermined usable frequency band; and a communication processing unit 82 that performs signal processing such as modulation processing and demodulation processing.

The main antenna 81 communicates with external devices (base stations) via a predetermined usable frequency band (for example, 800 MHz).

The communication processing unit 82 performs demodulation processing of a signal received by the main antenna 81, and transmits the processed signal to the processing unit 70. The communication processing unit 82 performs modulation processing of the signal transmitted from the processing unit 70, and transmits the signal to external devices (base stations) via the main antenna 81.

The power supply circuit unit 90 converts a power supply voltage supplied from the rechargeable battery 91 into a predetermined power voltage, and supplies the converted power supply voltage to the communication unit 80, the processing unit 70, etc.

The storage unit 100 stores a multitude of programs to be executed by the processing unit 70, as well as parameters, various tables, etc. More specifically, the storage unit 100 stores, for example, a table 110, in addition to a multitude of application programs and the like controlled by a control unit 72 (to be described later). The table 110 indicates, for example, a correspondence relationship between the patterns of presence or absence of light reception in the first light receiving units 61, and the rotation positions of the display unit side body 3 relative to the operation unit side body 2. Moreover, the table 110 indicates a correspondence relationship between each rotation position detected by a rotation position detecting unit 71 (to be described later) and predetermined behavior corresponding to each rotation position.

The processing unit 70 performs predetermined processing. As shown in FIG. 10, the processing unit 70 includes the rotation position detecting unit 71 and the control unit 72. The rotation position detecting unit 71 detects a rotation position of the display unit side body 3 relative to the operation unit side body 2. The control unit 72 activates a predetermined application that causes predetermined behavior corresponding to a rotation position detected by the rotation position detecting unit 71 to function, and controls the predetermined application thus activated.

Next, a description is provided for behavior of the rotation position detecting unit 71 that detects a rotation position of the display unit side body 3 relative to the operation unit side body 2 in the cellular telephone 1 of the first embodiment.

The rotation position detecting unit 71 detects a rotation position of the display unit side body 3 relative to the operation unit side body 2 as follows.

For example, as shown in FIG. 5, in a case in which the first light receiving units 61b and 61c among three of the first light receiving units 61 have successfully confirmed light reception of the light from the first light emitting units 51, the rotation position detecting unit 71 refers to the table 110 in the storage unit 100 to detect that the rotation position of the display unit side body 3 relative to the operation unit side body 2 is the "first position".

Moreover, as shown in FIG. 6, in a case in which the first light receiving units 61a and 61b among three of the first light receiving units 61 have successfully confirmed light reception of the light from the first light emitting units 51, the rotation position detecting unit 71 refers to the table 110 in the storage unit 100 to detect that the rotation position of the display unit side body 3 relative to the operation unit side body 2 is the "second position".

In addition, as shown in FIG. 7, in a case in which only the first light receiving unit 61a among three of the first light receiving units 61 has successfully confirmed light reception of the light from the first light emitting unit 51, the rotation position detecting unit 71 refers to the table 110 in the storage unit 100 to detect that the rotation position of the display unit side body 3 relative to the operation unit side body 2 is the "third position".

Furthermore, as shown in FIG. 8, in a case in which only the first light receiving unit 61c among three of the first light receiving units 61 has successfully confirmed light reception of the light from the first light emitting unit 51, the rotation position detecting unit 71 refers to the table 110 in the storage unit 100 to detect that the rotation position of the display unit side body 3 relative to the operation unit side body 2 is the "fourth position".

The control unit 72 then refers to the table 110 in the storage unit 100, activates a predetermined application that causes predetermined behavior to function, and operates a function to control the predetermined application thus activated, depending on which of the "first rotation position", the "second rotation position", the "third rotation position" or the "fourth rotation position" is the rotation position of the display unit side body 3 relative to the operation unit side body 2.

According to the cellular telephone 1 of the first embodiment with the aforementioned configuration, effects described below are achieved.

The cellular telephone 1 of the first embodiment includes the rotation position detecting unit 71 that detects a rotation position of the display unit side body 3 relative to the operation unit side body 2 by detecting presence or absence of light reception, in the first light receiving units 61, of the light R emitted from the first light emitting units 51. Moreover, the first light emitting units 51 are disposed on the first circumference C1 in the operation unit side body 2. The first light receiving units 61 are disposed on the second circumference C2 in the display unit side body 3.

Therefore, in the first embodiment, a relative rotation position between the two bodies 2 and 3 can be optically detected, without utilizing a difference of reflection efficiency in a plurality of reflecting portions. Therefore, influence due to deterioration of the reflection efficiency in the reflecting portions is not suffered. In addition, the first light emitting units 51 are disposed on the first circumference C1, and the first light receiving units 61 are disposed on the second circumference C2; therefore, a plurality of desired rotation positions can be easily detected.

Furthermore, the display unit side body 3 is held to the operation unit side body 2 in a plurality of positions, in which the rotation angle θ of the display unit side body 3 relative to the operation unit side body 2 is a multiple of the preset setting angle φ. Moreover, the first light emitting unit(s) 51 is disposed in a part or all of the plurality of positions (the first position S11, the second position S12, the third position S13 and the fourth position S14) on the first circumference C1 such that the angle thereof is a multiple of the setting angle φ. Furthermore, the first light emitting unit(s) 61 is disposed in a part or all of the plurality of positions (the first position S21, the second position S22, the third position S23 and the fourth position S24) on the second circumference C2 such that the angle thereof is a multiple of the setting angle φ. Therefore, even if the plurality of positions on the second circumference C2 include a position without the first light receiving unit 61, as long as the first light receiving unit 61 is provided in another position, a rotation position can be detected.

Moreover, the integer N, the first number L and the second number R satisfy the relationship expressed by the formulae 1 and 2 below.

$$L \leq R \leq N \qquad \text{Formula 1:}$$

$$N \leq L+R \leq 2N-1 \qquad \text{Formula 2:}$$

Therefore, the first light receiving units 61 do not have to determine which of the plurality of the first light emitting units 51 has emitted the light. In addition, a rotation position of the display unit side body 3 relative to the operation unit side body 2 can be detected only by the first light receiving unit 61 determining presence or absence of light reception.

Furthermore, the integer N, the first number L and the second number R further satisfy the relationship expressed by the formula 3 below.

$$L+R \geq N+1 \qquad \text{Formula 3:}$$

Therefore, it is securely possible to obtain a state in which at least one of the plurality of first light receiving units 61 receives the light emitted from the first light emitting units 51. As a result, in addition to the purpose of detecting a rotation position, the light received by the first light receiving unit 61 can be utilized as, for example, a signal from the operation unit side body 2 to the display unit side body 3.

Moreover, the first light receiving units 61 receive the light emitted from the first light emitting units 51, thereby transmitting a signal from the operation unit side body 2 to the display unit side body 3. In this way, the light for detecting a rotation position is utilized for communicating a signal, thereby making it possible to achieve size reduction of the entire cellular telephone 1, as compared to a case of separately providing a configuration for communicating the light.

In addition, the first embodiment further includes the second light emitting unit 52 and the second light receiving unit 62, and the second light receiving unit 62 receives the light emitted from the second light emitting unit 52, thereby transmitting a signal from the display unit side body 3 to the operation unit side body 2. Therefore, bidirectional signal communication utilizing the light is enabled between the operation unit side body 2 and the display unit side body 3.

Figure 11:
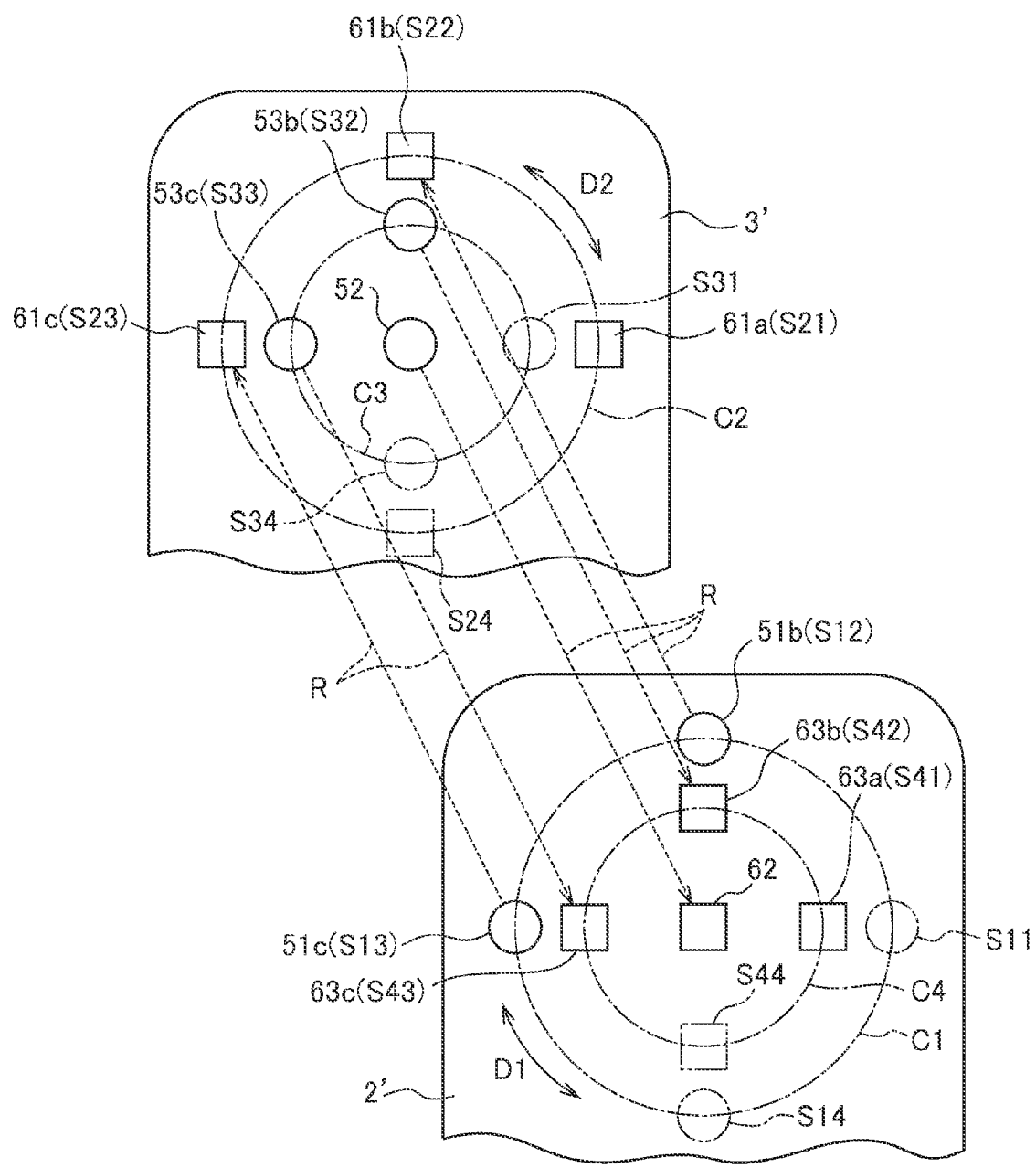
FIG. 11 is a diagram schematically showing a configuration for transmitting and receiving light in a cellular telephone of a second embodiment of the present invention (FIG. 11 corresponds to FIG. 3).

Next, a second embodiment of the present invention is described with reference to FIG. 11. FIG. 11 is a diagram schematically showing a configuration for transmitting and receiving light in a cellular telephone of the second embodiment of the present invention (FIG. 11 corresponds to FIG. 3).

The second embodiment is mainly different from the first embodiment in that the light emitting units and the light receiving units are provided on the circumference around the rotational axis 41 in both of the operation unit side body 2 and the display unit side body 3. More specifically, the second embodiment is different from the first embodiment in that third light emitting units 53 are further provided on a third circumference C3 in the display unit side body 3, and third light receiving units 63 are further provided on a fourth circumference C4 in the operation unit side body 2.

The second embodiment is described mainly in terms of differences from the first embodiment. The description regarding the first embodiment is applied as appropriate where no description is particularly provided regarding the second embodiment. In the description of the second embodiment, a configuration similar to that in the first embodiment is assigned with the same reference numeral, or an apostrophe is appended to the reference numeral.

In detail, as shown in FIG. 11, the second embodiment includes an operation unit side body 2', a display unit side body 3', and a processing unit 70' (not shown) including a rotation position detecting unit 71'.

The first light emitting units 51 (51b, 51c) that emit light, the second light receiving unit 62 that receives light, and the third light receiving units 63 (63a, 63b, 63c) that receive light are mounted in the operation unit side body 2'.

The third light emitting units 53 (53b, 53c) that emit light, the second light emitting unit 52 that emits light, and the first light receiving units 61 (61a, 61b, 61c) that receive light are mounted in the display unit side body 3'.

The first light emitting units 51 are disposed on the first circumference C1 around the rotational axis 41 in the operation unit side body 2.

The second light receiving unit 62 is disposed in a position overlapping with the rotational axis 41 in the operation unit side body 2.

The first light receiving units 61 are disposed on the second circumference C2 around the rotational axis 41 and facing the first circumference C1 in the display unit side body 3.

The third light emitting units 53 are disposed on the third circumference C3 around the rotational axis 41 in the display unit side body 3.

The second light emitting unit 52 is disposed in a position overlapping with the rotational axis 41 and facing the second light receiving unit 62 in the display unit side body 3.

The third light receiving units 63 are disposed on the fourth circumference C4 around the rotational axis 41 and facing the third circumference C3 in the operation unit side body 2.

By detecting presence or absence of light reception, in the first light receiving units 61, of the light R emitted from the first light emitting units 51, or presence or absence of light reception, in the third light receiving units 63, of the light R emitted from the third light emitting units 53, the rotation position detecting unit 71' detects a rotation position of the display unit side body 3 relative to the operation unit side body 2, and transmits and receives a signal between the operation unit side body 2 and the display unit side body 3.

The processing unit 70' including the rotation position detecting unit 71' has a configuration similar to, and performs behavior similar to, those of the processing unit 70 in the first embodiment.

The third light emitting units 53 and the third light receiving units 63 in the second embodiment are described.

The third light emitting unit(s) 53 is disposed in a part or all of the plurality of positions on the third circumference C3 such that the angle thereof is a multiple of the setting angle φ. The third circumference C3 is a virtual circumference on which the third light emitting units 53 are positioned. On the third circumference C3, a position on an upper end portion side (an upper side thereof in FIG. 11) in the display unit side body 3 from the rotational axis 41 is referred to as a "second position S32". A position on a lower end portion side (a lower side thereof in FIG. 11) in the display unit side body 3 from the rotational axis 41 is referred to as a "fourth position S34". Moreover, a position of being displaced 90 degrees clockwise from the second position S32 is referred to as a "first position S31". A position of being displaced 90 degrees anticlockwise from the second position S32 is referred to as a "third position S33".

An expression "the third light emitting units 53" is used when providing a description that is common to each of the third light emitting units. In addition, when providing an individual description of each of the first light emitting units, an expression such as a "third light emitting unit 53b" and a "third light emitting unit 53c" is used.

In the second embodiment, the third light emitting unit 53b is disposed in the second position S32. The third light emitting unit 53c is disposed in the third position S33. The plurality of the third light emitting units 53 are adjacently disposed.

On the other hand, the third light emitting units 53 are not disposed in the first position S31 and the fourth position S34. It should be noted that the first position S31 and the fourth position S34 are indicated with a two-dot chain line in FIG. 11.

The third light receiving unit(s) 63 is disposed in a part or all of the plurality of positions on the fourth circumference C4 such that the angle thereof is a multiple of the setting angle φ. The fourth circumference C4 is a virtual circumference on which the third light receiving units 63 are positioned. On the fourth circumference C41, a position on an upper end portion side (an upper side thereof in FIG. 11) in the operation unit side body 2 from the rotational axis 41 is referred to as a "second position S42". A position on a lower end portion side (a lower side thereof in FIG. 11) in the operation unit side body 2 from the rotational axis 41 is referred to as a "fourth position S44". Moreover, a position of being displaced 90 degrees clockwise from the second position S42 is referred to as a "first position S41". A position of being displaced 90 degrees anticlockwise from the second position S42 is referred to as a "third position S43".

An expression "the third light receiving units 63" is used when providing a description that is common to each of the third light receiving units. In addition, when providing an individual description of each of the third light receiving units, an expression such as a "third light receiving unit 63a", a "third light receiving unit 63b" and a "third light receiving unit 63c" is used.

In the second embodiment, the first light receiving unit 63a is disposed in the first position S41, the first light receiving unit 63b is disposed in the second position S42, and the first light receiving unit 63c is disposed in the third position S43. The plurality of the third light receiving units 63 are adjacently disposed.

On the other hand, the third light receiving unit 63 is not disposed in the fourth position S44. It should be noted that the fourth position S44 is indicated with a two-dot chain line in FIG. 11.

In the cellular telephone 1 of the second embodiment, the first light receiving units 61 receive the light R emitted from the first light emitting units 51, thereby transmitting a signal from the operation unit side body 2 to the display unit side body 3. Similarly, the third light receiving units 63 receive the light R emitted from the third light emitting units 53, thereby transmitting a signal from the display unit side body 3 to the operation unit side body 2.

Furthermore, the second light receiving unit 62 receives the light R emitted from the second light emitting unit 52, thereby transmitting a signal from the display unit side body 3 to the operation unit side body 2.

According to the cellular telephone of the second embodiment, the effects similar to those of the first embodiment are achieved, and in addition, the bidirectional signal communication utilizing the light is further facilitated between the operation unit side body 2 and the display unit side body 3.

Although the embodiments of the present invention have been described above, the present invention is not limited to the aforementioned embodiments.

For example, in the first embodiment, the operation unit side body 2 is the first body (in other words, the first light emitting units 51 are provided to the operation unit side body 2), and the display unit side body 3 is the second body (in other words, the first light receiving units 61 are provided to the display unit side body 3); however, it is not limited thereto. Conversely, the operation unit side body 2 may be the second body (in other words, the first light receiving units 61 are provided to the operation unit side body 2), and the display unit side body 3 may be the first body (in other words, the first light emitting units 51 are provided to the display unit side body 3).

Moreover, in place of the first light emitting units 51 or the first light receiving units 61, a light receiving/emitting element having both a light emitting function and a light reception function can be used. In that case, the light emitted from a light receiving/emitting element in the operation unit side body 2 can be received by a light receiving/emitting element in the display unit side body 3, and the light emitted from the light receiving/emitting element in the display unit side body 3 can be received by the light receiving/emitting element in the operation unit side body 2. It should be noted that, in a case of using the light receiving/emitting element, it is preferable to perform processing that eliminates interference by way of subtraction processing of light emission, in order to secure a state without interference of light reception and light emission.

Although the setting angle φ is 90 degrees in the first and second embodiments, it is not limited thereto. The setting angle φ may be, for example, 180 degrees, 120 degrees, 72 degrees, 60 degrees, 45 degrees or 30 degrees.

Specific examples are hereinafter described for combinations of the integer N, the first number L and the second number R that satisfy the relationship of the formulae 1 and 2 in cases in which the setting angle φ is 180 degrees, 120 degrees, 72 degrees and 60 degrees.

The combination of the integer N, the first number L and the second number R that satisfies the relationship of the formulae 1 and 2 in a case in which the setting angle φ is 180 degrees is as follows.

(N, L, R)=(2,1,1), (2,1,2)

The combination of the integer N, the first number L and the second number R that satisfies the relationship of the formulae 1 and 2 in a case in which the setting angle φ is 120 degrees is as follows.

(N, L, R)=(3,1,2), (3,1,3), (3,2,2), (3,2,3)

The combination of the integer N, the first number L and the second number R that satisfies the relationship of the formulae 1 and 2 in a case in which the setting angle φ is 90 degrees is as follows.

(N, L, R)=(4,1,3), (4,1,4), (4,2,2), (4,2,3), (4,2,4), (4,3,3), (4,3,4)

The combination of the integer N, the first number L and the second number R that satisfies the relationship of the formulae 1 and 2 in a case in which the setting angle φ is 72 degrees is as follows.

(N, L, R)=(5,1,4), (5,1,5), (5,2,3), (5,2,4), (5,2,5), (5,3,3), (5,3,4), (5,3,5), (5,4,4), (5,4,5)

The combination of the integer N, the first number L and the second number R that satisfies the relationship of the formulae 1 and 2 in a case in which the setting angle φ is 60 degrees is as follows.

(N, L, R)=(6,1,5), (6,1,6), (6,2,4), (6,2,5), (6,2,6), (6,3,3), (6,3,4), (6,3,5), (6,3,6), (6,4,4), (6,4,5), (6,4,6), (6,5,5), (6,5,6)

Disposition examples (examples 1 to 5) of the first light emitting units 51, the first light receiving units 61, the third light emitting units 53 and the third light receiving units 63 in a case in which the setting angle φ is 90 degrees are described as follows (Table 1). It should be noted that, in Table 1, a symbol "○" denotes that the first light emitting units 51, etc. are disposed. A symbol "×" or "–" denotes that the first light emitting units 51, etc. are not disposed.

For example, Example 1 is an example in which the first light emitting unit 51 is disposed only in the position S12, and the first light emitting units 51 are not disposed in the positions S11, S13 and S14; and the first light receiving units 61 are disposed in the positions S21, S22 and S23, and the first light receiving unit 61 is not disposed in the position S24 (it should be noted that the third light emitting units 53 and the third light receiving units 63 are not provided).

TABLE 1

| Position | Example 1 | Example 2 | Example 3 | Example 4 | Example 5 | Example 6 |
|---|---|---|---|---|---|---|
| S11 | X | X | X | X | ○ | ○ |
| S12 | ○ | ○ | ○ | ○ | ○ | ○ |
| S13 | X | X | ○ | ○ | ○ | ○ |
| S14 | X | X | X | X | X | X |
| S21 | ○ | ○ | X | ○ | ○ | ○ |
| S22 | ○ | ○ | ○ | ○ | ○ | ○ |
| S23 | ○ | ○ | ○ | ○ | ○ | ○ |
| S24 | X | ○ | X | ○ | X | X |
| S31 | — | — | — | — | — | ○ |
| S32 | — | — | — | — | — | ○ |
| S33 | — | — | — | — | — | ○ |
| S34 | — | — | — | — | — | X |
| S41 | — | — | — | — | — | ○ |
| S42 | — | — | — | — | — | ○ |
| S43 | — | — | — | — | — | ○ |
| S44 | — | — | — | — | — | X |

It should be noted that, in each Example, the second light emitting units 52 and the second light receiving units 62 may be further provided, or the second light emitting units 52 and the second light receiving units 62 may not be provided. Moreover, in an example in which the third light emitting units 53 and the third light receiving units 63 are provided, the third light emitting units 53 and the third light receiving units 63 can be further provided in the disposition positions similar to the disposition example of the first light emitting units 51 and the first light receiving units 61.

Although the cellular telephone 1 of the aforementioned embodiments is of a rotating type (turning type), the present invention is not limited thereto. For example, the present invention can be applied to an opening-and-closing type (hinge type) in which the display unit side body 3 and the operation unit side body 2 are connected so as to be rotatable (openable and closable) around the rotational axis extending in the width direction thereof, thereby making it possible to detect a rotation position in the opening-and-closing type as well.

In addition, although the aforementioned embodiments described examples in which the second light emitting units 52 and the second light receiving units 62 are provided to the rotational axis 41, instead, for example, electric circuit wiring that provides an electric signal or a power supply from the operation unit side body 2 to the display unit side body 3 may be provided to a central portion of the rotational axis 41. Furthermore, the electric circuit wiring may include, for example: operation unit side power supply wiring being connected to a power supply provided to the operation unit side body 2, and being disposed in the center of the rotational axis 41; and operation unit side power supply wiring being disposed in the center of the rotational axis 41, and being rotatably in contact with the operation unit side power supply wiring.

The electronic device of the present invention can be applied to electronic devices other than a cellular telephone. Electronic devices other than a cellular telephone may include, for example, PHS (registered trademark: Personal Handyphone System), portable gaming machines, portable navigation devices, PDA (Personal Digital Assistant), notebook computers, and EL displays or liquid crystal displays equipped with an operation unit.

The invention claimed is:

1. An electronic device, comprising:
a first light emitting unit that emits light;
a first body in which the first light emitting unit is mounted;
a first light receiving unit that receives light;
a second body, in which the first light receiving unit is mounted, and which is connected to the first body so as to be rotatable around a rotational axis; and
a detecting unit that detects a rotation position of the second body relative to the first body, by detecting presence or absence of light reception, in the first light receiving unit, of the light emitted from the first light emitting unit,
wherein the first light emitting unit is disposed on a first circumference around the rotational axis in the first body, wherein the first light receiving unit is disposed on a second circumference facing the first circumference and being around the rotational axis in the second body, wherein the second body is held to the first body in a plurality of rotation positions, in which a rotation angle of the second body relative to the first body is a multiple of a preset setting angle, wherein the first light emitting unit is disposed in a part or all of the plurality of rotation positions on the first circumference such that an angle thereof is a multiple of the setting angle, wherein the first light receiving unit is disposed in a part or all of the plurality of rotation positions on the second circumference such that an angle thereof is a multiple of the setting angle, and wherein the first light receiving unit is disposed such that a disposition pattern of the first light emitting unit in any rotation position of the plurality of rotation positions is not a same disposition pattern as a disposition pattern of the first light emitting unit in another rotation position of the plurality of rotation positions.

2. The electronic device according to claim 1, wherein, in a case in which an integer obtained by dividing 360 degrees by the setting angle is an integer N, a number of the first light emitting unit disposed on the first circumference in a position such that an angle thereof is a multiple of the setting angle is a first number L, and a number of the first light receiving unit disposed on the second circumference in a position such that an angle thereof is a multiple of the setting angle is a second number R, the integer N, the first number L and the second number R are set so as to satisfy a relationship expressed by formulae 1 and 2 below:

$L \leq R \leq N$ \hfill formula 1:

$N \leq L+R \leq 2N-1$. \hfill formula 2:

3. The electronic device according to claim 2, wherein the integer N, the first number L and the second number R are set so as to satisfy a relationship expressed by formula 3 below:

$L+R \geq N+1$. \hfill formula 3:

4. The electronic device according to claim 1, wherein the first light receiving unit receives the light emitted from the first light emitting unit, thereby transmitting a signal from the first body to the second body.

5. An electronic device comprising:

a first light emitting unit that emits light;

a first body in which the first light emitting unit is mounted;

a first light receiving unit that receives light;

a second body, in which the first light receiving unit is mounted, and which is connected to the first body so as to be rotatable around a rotational axis;

a detecting unit that detects a rotation position of the second body relative to the first body, by detecting presence or absence of light reception, in the first light receiving unit, of the light emitted from the first light emitting unit, a second light emitting unit that is mounted in a position overlapping with the rotational axis in the second body; and a second light receiving unit, which is mounted in a position overlapping with the rotational axis in the first body, and which is disposed so as to face the second light emitting unit, wherein the first light emitting unit is disposed on a first circumference around the rotational axis in the first body, wherein the first light receiving unit is disposed on a second circumference facing the first circumference and being around the rotational axis in the second body, and wherein the second light receiving unit receives the light emitted from the second light emitting unit, thereby transmitting a signal from the second body to the first body.

6. An electronic device, comprising:

a first light emitting unit that emits light;

a first light receiving unit that receives light;

a first body in which the first light emitting unit and the first light receiving unit are mounted;

a second light emitting unit that emits light;

a second light receiving unit that receives light;

a second body, in which the second light emitting unit and the second light receiving unit are mounted, and which is connected to the first body so as to be rotatable around a rotational axis; and a detecting unit that detects presence or absence of light reception, in the first light receiving unit, of the light emitted from the first light emitting unit, or presence or absence of light reception, in the second light receiving unit, of the light emitted from the second light emitting unit, thereby detecting a rotation position of the second body relative to the first body, and transmitting and receiving a signal between the first body and the second body, wherein the first light emitting unit is disposed on a first circumference around the rotational axis in the first body, wherein the first light receiving unit is disposed on a second circumference facing the first circumference and being around the rotational axis in the second body, wherein the second light emitting unit is disposed on a third circumference around the rotational axis in the second body, and wherein the second light receiving unit is disposed on a fourth circumference facing the third circumference and being around the rotational axis in the first body.

* * * * *